United States Patent
Lo et al.

(10) Patent No.: US 8,548,919 B2
(45) Date of Patent: Oct. 1, 2013

(54) SYSTEM AND METHOD FOR SELF-PROVISIONING OF VIRTUAL IMAGES

(75) Inventors: Yuan-Chang Lo, Austin, TX (US); Clint H. O'Connor, Austin, TX (US); David Konetski, Austin, TX (US); Gary D. Huber, Austin, TX (US); Neeraj Srivastava, Austin, TX (US); Shree A. Dandekar, Round Rock, TX (US); Michael Haze, Round Rock, TX (US); William A. Curtis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 12/696,380

(22) Filed: Jan. 29, 2010

(65) Prior Publication Data

US 2011/0191765 A1    Aug. 4, 2011

(51) Int. Cl.
*G06F 21/00* (2013.01)
*G06F 15/173* (2006.01)

(52) U.S. Cl.
USPC ............................... 705/59; 709/223

(58) Field of Classification Search
USPC .......................................................... 705/59
See application file for complete search history.

(56) References Cited

U.S. PATENT DOCUMENTS

| | | |
|---|---|---|
| 5,490,216 A | 2/1996 | Richardson, III |
| 5,659,614 A | 8/1997 | Bailey, III |
| 5,715,314 A | 2/1998 | Payne et al. |
| 5,864,664 A | 1/1999 | Capps, Jr. et al. |
| 5,948,078 A | 9/1999 | Joffe |
| 6,032,859 A | 3/2000 | Muehlberger et al. |
| 6,170,059 B1 | 1/2001 | Pruett et al. |
| 6,209,089 B1 | 3/2001 | Selitrennikoff et al. |
| 6,292,941 B1 | 9/2001 | Jollands |
| 6,301,612 B1 | 10/2001 | Selitrennikoff et al. |
| 6,314,418 B1 | 11/2001 | Namba |
| 6,321,262 B1 | 11/2001 | Springer |
| 6,324,525 B1 | 11/2001 | Kramer et al. |
| 6,389,403 B1 | 5/2002 | Dorak, Jr. |
| 6,425,126 B1 | 7/2002 | Branson et al. |
| 6,647,532 B1 | 11/2003 | Boede et al. |
| 6,931,558 B1 | 8/2005 | Jeffe et al. |
| 7,047,411 B1 | 5/2006 | DeMello et al. |
| 7,120,593 B1 | 10/2006 | Fry et al. |
| 7,352,999 B2 | 4/2008 | Miettinen |
| 7,412,534 B2 | 8/2008 | Tsang et al. |
| 7,417,546 B2 | 8/2008 | Llorca et al. |
| 7,428,413 B2 | 9/2008 | Fink |
| 7,483,860 B2 | 1/2009 | Cronce et al. |

(Continued)

OTHER PUBLICATIONS

Laplink, Laplink Offers Licensing for Windows XP to Windows 7 Upgrade Solution, Oct. 28, 2009.

(Continued)

*Primary Examiner* — Charles C Agwumezie
(74) *Attorney, Agent, or Firm* — Terrile, Cannatti, Chambers & Holland, LLP; Stephen A. Terrile

(57) ABSTRACT

A system, method, and computer-readable medium are disclosed for automatically provisioning a virtual image on a target system. A service operating system comprising a virtual machine monitor and a personalization agent is installed on a target system. A set of digital assets entitlement data is provided along with an associated set of digital assets data contained in a virtual software image, which is then installed on the target system by the personalization agent.

9 Claims, 10 Drawing Sheets

(56) References Cited

U.S. PATENT DOCUMENTS

| | | | |
|---|---|---|---|
| 7,496,739 B1 | 2/2009 | Raghavan et al. | |
| 7,503,072 B2 | 3/2009 | Hughes et al. | |
| 7,506,382 B2 | 3/2009 | Padole et al. | |
| 7,516,104 B1 | 4/2009 | Scardino | |
| 7,523,072 B2 | 4/2009 | Stefik et al. | |
| 7,526,451 B2 | 4/2009 | Park et al. | |
| 7,555,447 B2 | 6/2009 | Chinnappan et al. | |
| 7,565,325 B2 | 7/2009 | Lenard et al. | |
| 7,593,898 B1 | 9/2009 | Tsuei et al. | |
| 7,783,737 B2 * | 8/2010 | Fujino et al. | 709/223 |
| 7,971,199 B1 | 6/2011 | Chen | |
| 8,219,850 B1 | 7/2012 | Wang et al. | |
| 2002/0059270 A1 | 5/2002 | Schlabach et al. | |
| 2002/0076204 A1 | 6/2002 | Nakano et al. | |
| 2002/0077986 A1 | 6/2002 | Kobata et al. | |
| 2002/0088855 A1 | 7/2002 | Hodes | |
| 2003/0028439 A1 | 2/2003 | Cox | |
| 2003/0033205 A1 | 2/2003 | Nowers et al. | |
| 2003/0060157 A1 * | 3/2003 | Henrick | 455/3.04 |
| 2003/0110126 A1 | 6/2003 | Dunkeld et al. | |
| 2003/0149750 A1 | 8/2003 | Franzenburg | |
| 2004/0022227 A1 | 2/2004 | Lynch et al. | |
| 2004/0059938 A1 | 3/2004 | Hughes et al. | |
| 2004/0093273 A1 | 5/2004 | Laurent et al. | |
| 2004/0128551 A1 | 7/2004 | Walker et al. | |
| 2004/0143746 A1 | 7/2004 | Ligeti et al. | |
| 2005/0027657 A1 | 2/2005 | Leontiev et al. | |
| 2005/0060388 A1 | 3/2005 | Tasumi et al. | |
| 2005/0229047 A1 | 10/2005 | Hanes et al. | |
| 2005/0262573 A1 | 11/2005 | Bo et al. | |
| 2005/0268115 A1 | 12/2005 | Barde et al. | |
| 2006/0062426 A1 | 3/2006 | Levy et al. | |
| 2006/0161635 A1 | 7/2006 | Lamkin et al. | |
| 2006/0276174 A1 * | 12/2006 | Katz et al. | 455/410 |
| 2007/0157196 A1 | 7/2007 | Goicea et al. | |
| 2007/0174621 A1 | 7/2007 | Ducharme | |
| 2007/0233580 A1 | 10/2007 | Pike et al. | |
| 2007/0255758 A1 | 11/2007 | Zheng et al. | |
| 2008/0177807 A1 | 7/2008 | Dile et al. | |
| 2008/0195871 A1 | 8/2008 | Peinado et al. | |
| 2009/0083843 A1 | 3/2009 | Wilkinson et al. | |
| 2009/0187491 A1 * | 7/2009 | Bull et al. | 705/26 |
| 2009/0193102 A1 | 7/2009 | Trujillo | |
| 2009/0228368 A1 | 9/2009 | Brown | |
| 2009/0228488 A1 | 9/2009 | Brand et al. | |
| 2009/0234892 A1 | 9/2009 | Anglin et al. | |
| 2009/0265545 A1 | 10/2009 | Satoh et al. | |
| 2010/0106691 A1 | 4/2010 | Preslan et al. | |
| 2010/0235921 A1 | 9/2010 | Foster | |
| 2010/0257403 A1 | 10/2010 | Virk et al. | |
| 2010/0306227 A1 | 12/2010 | Fleming et al. | |
| 2010/0325735 A1 | 12/2010 | Etchegoyen | |
| 2011/0016466 A1 | 1/2011 | Liu et al. | |
| 2011/0022812 A1 | 1/2011 | van Der Linden et al. | |
| 2011/0072291 A1 | 3/2011 | Murase | |
| 2011/0099200 A1 | 4/2011 | Blount et al. | |
| 2011/0173405 A1 | 7/2011 | Grabarnik et al. | |
| 2011/0184998 A1 | 7/2011 | Palahnuk et al. | |

OTHER PUBLICATIONS

Backup P2P Secured peer to peer backup, http://www.ohloh.net/p/p2pbackupsmile, printed Jun. 18, 2010.

Landers et al., PeerStore: Better Performance by Relaxing in Peer-to-Peer Backup, Fakultät Für Informatik, Technische Universität München, 2004 http://www.computer.org/portal/web/csdl/doi/10.1109/PTP.2004.1334933.

Peer-to-Peer Viral Backup: Cucku 2.0 Definitely Scores Points for Imagination, http://www.fileslinger.com/2009/05/peer-to-peer-viral-backup-cucku-20-definitely-scores-points-forimagination, printed Jun. 18, 2010.

T. Bonkenburg et al, LifeBoat—An Autonomic Backup and Restore Solution, http://www.usenix.org/event/lisa04/tech/full_papers/bonkenburg/bonkenburg.pdf, 2004 Lisa XVIII—Nov. 14-19, 2004—Atlanta, GA.

M. Vrable, Cumulus: Filesystem Backup to the Cloud, http://cseweb.ucsd.edu/~voelker/pubs/cumulus-fast09.pdf, Feb. 26, 2009.

L. Mearian, Start-up unveils hybrid cloud/on-site backup service, http://www.itworld.com/storage/64972/start-unveils-hybrid-cloudon-site-backup-service, Mar. 24, 2009.

Storage-Switzerland.Com, Hybrid Cloud Backup for the SMB, http://www.storage-switzerland.com/Articles/Entries/2009/4/24_Hybrid_Cloud_Backup_for_the_SMB.html, Apr. 24, 2009.

M. Staimer, Asigra, Why Cloud Backup/Recovery (Private, Public, or Hybrid) WILL be Your Data Protection, http://www.docstoc.com/docs/16851799/Why-Cloud-Backup-Recovery-(Private—Public—or-Hybrid)-WILL-be, printed Jun. 18, 2010.

CISCO License Manager 2.2, http://www.cisco.com/en/US/products/ps7138/index.html, printed Jun. 15, 2010.

Proquest, Sprint and MercuryMD Team up to Offer Healthcare Providers One-Stop Shopping Opportunity for Mobility Solutions, PR Newswire. New York: Apr. 27, 2004. p. 1; http://proquest.umi.com/pqdweb?did=624136671&sid=4&Fmt=3&clientId=19649&RQT=309&VName=POD.

Michigan Retailers Association, Member Services, Electronic Gift Card Processing FAQ, http://www.retailers.com/memberservices/giftcardsfaq.html, printed Apr. 19, 2010.

* cited by examiner

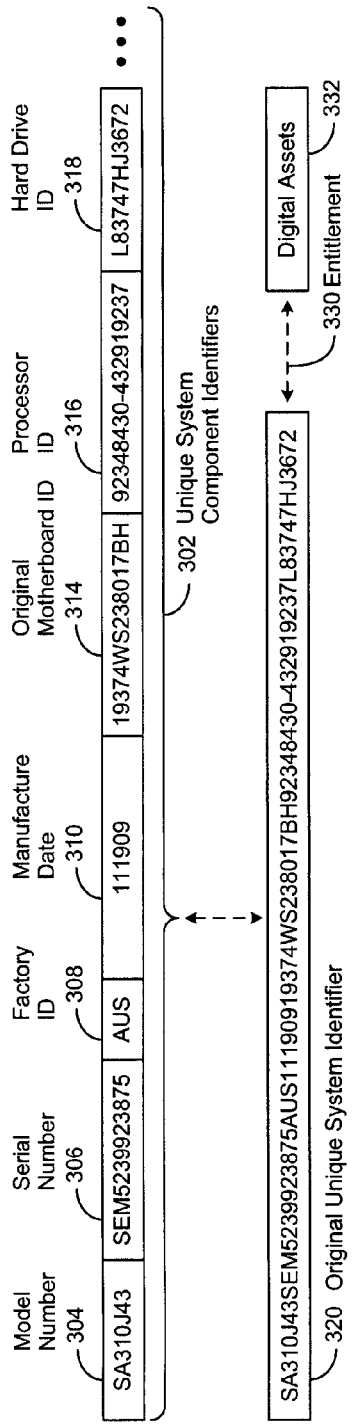
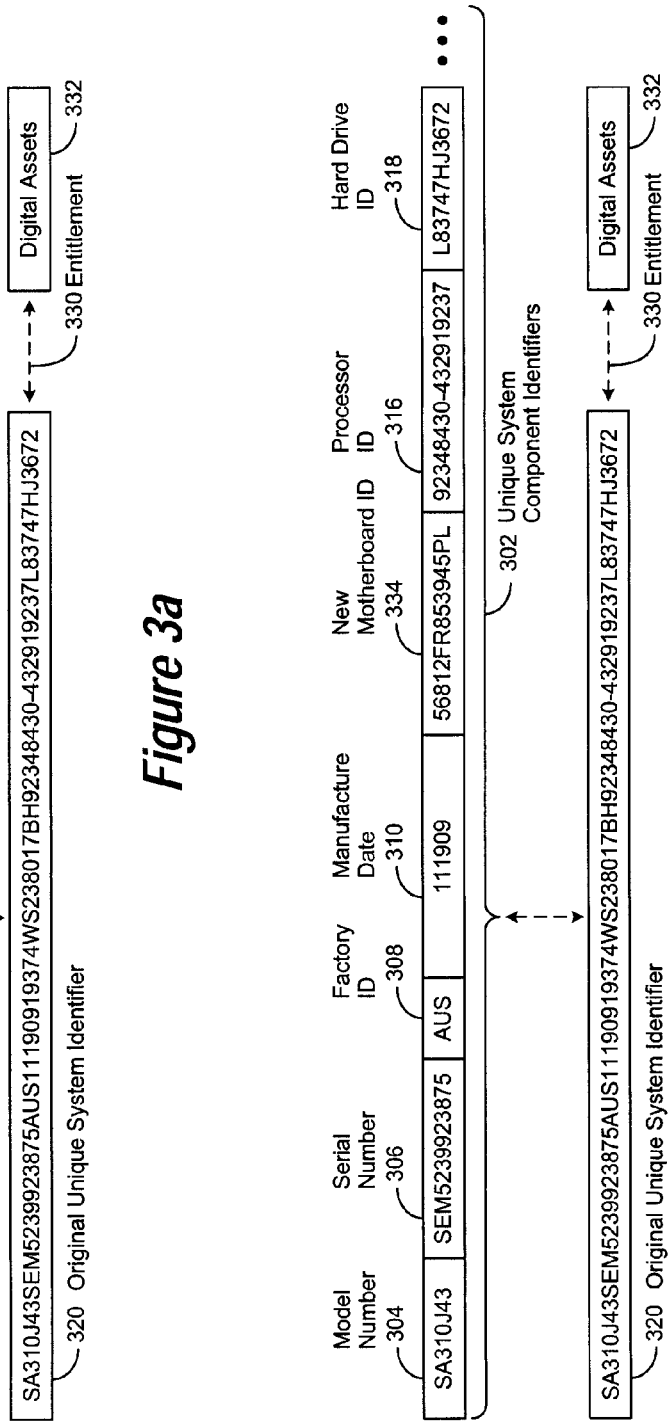

SYSTEM AND METHOD FOR SELF-PROVISIONING OF VIRTUAL IMAGES

BACKGROUND OF THE INVENTION

1. Field of the Invention

The present invention relates to the management of information handling systems. More specifically, embodiments of the invention provide a system, method, and computer-readable medium for automatically provisioning a virtual image on a target system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, it has become common for manufacturers to offer purchasers the ability to order a system custom-configured to their specification. These custom-configured systems, which are often ordered on-line, allow the purchaser to select the OS of their choice along with a selection of software and other digital assets to meet their individual needs. In some cases, the manufacturer may preinstall the OS and the selected digital assets on the system prior to delivery. In addition, the system may be further personalized (e.g., desktop themes and colors, etc.) as a service to the customer. Such customizations and personalizations may be limited only by the customer's patience and willingness to define or describe their ideal system.

Some of these same manufacturers also offer standardized configurations of these systems bundled with an operating system (OS) and a selection of software applications, digital content, and associated services. However, the purchaser of such a pre-configured system may wish to use a different OS or bundle of digital assets. As a result, the purchaser generally incurs additional expense and is typically required to de-install the original OS and bundle of digital assets before the different OS can be installed. Furthermore, some OS vendors are known to impose various restrictions on system vendors as to what they can and cannot do. In some cases, these restrictions are intended to protect the OS vendor's brand, the user's out-of-box experience (OOBE), and the ability to be the first to make up-sell or cross-sell offers. Due to these restrictions, system vendors are generally not allowed to alter the initial user experience presented to the customer nor pre-install customer-desired changes, even when that information is available or could be provided by the customer. In view of the foregoing, there is a need for more easily installing a desired OS and an associated bundle of digital assets on a target system while maintaining the user's OOBE.

SUMMARY OF THE INVENTION

A system, method, and computer-readable medium are disclosed for automatically provisioning a virtual image on a target system. In various embodiments, a digital assets entitlement system is implemented for managing the entitlement of a system to process digital assets. In these and other embodiments, the system comprises a unique system identifier, which in turn comprises the unique identifiers of predetermined system components.

In various embodiments, a service operating system comprising a virtual machine monitor and a personalization agent is installed on a target system. The personalization agent then provides a set of system identifier data associated with the target system. The set of system identifier data is then processed to determine a corresponding set of digital assets entitlement data, which is then provided along with an associated set of digital assets data to the target system, where it is installed by the personalization agent. In these and other embodiments, the set of associated set of digital assets data comprises a virtual software image further comprising an operating system operable to be executed in a virtual machine on the target system. In these and other embodiments, installation of the set of digital assets entitlement data allows the target system to process data associated with the installed set of digital assets data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3a-b are a simplified block diagram of a unique system identifier that remains the same when one of its associated system component identifiers has been changed;

DETAILED DESCRIPTION

A system, method, and computer-readable medium are disclosed for automatically provisioning a virtual image on a target system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
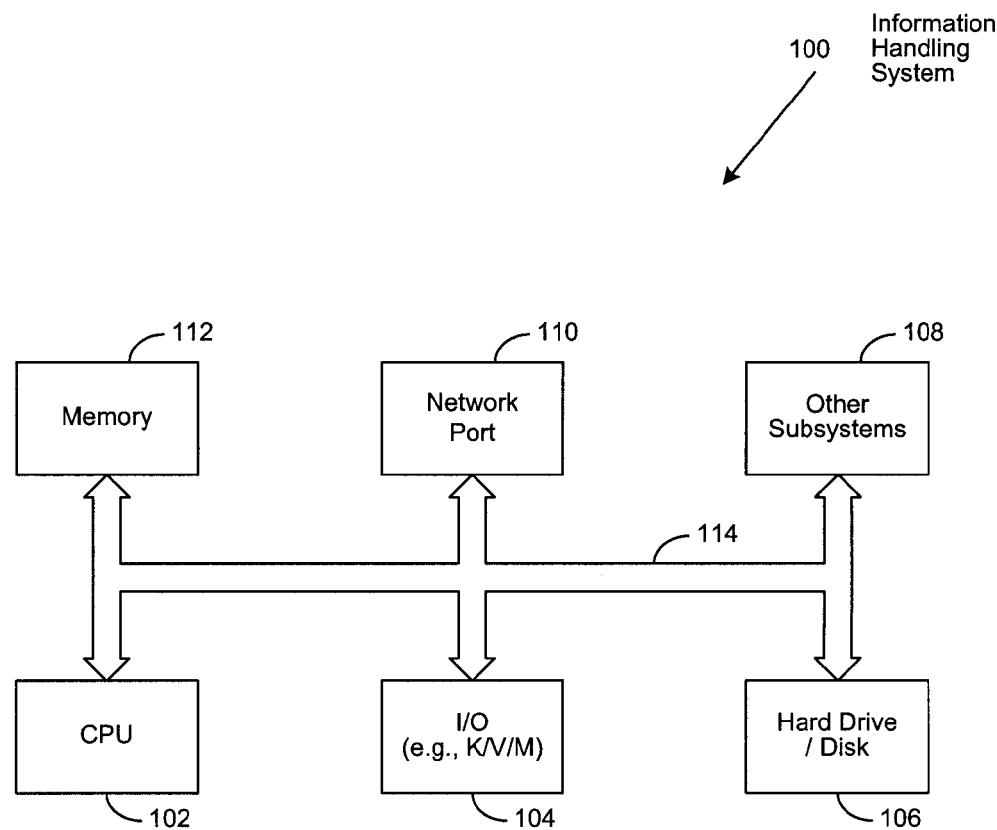
FIG. 1 is a general illustration of components of an information handling system as implemented in the system and method of the present invention.

FIG. 1 is a generalized illustration of an information handling system 100 that can be used to implement the method and system of the present invention. The information handling system 100 includes a processor (e.g., central processor unit or "CPU") 102, input/output (I/O) devices 104, such as a display, a keyboard, a mouse, and associated controllers, a hard drive or disk storage 106, various other subsystems, such as a storage interface 108, a network port 110, and a system memory 112, all interconnected via one or more buses 114.

Figure 2:
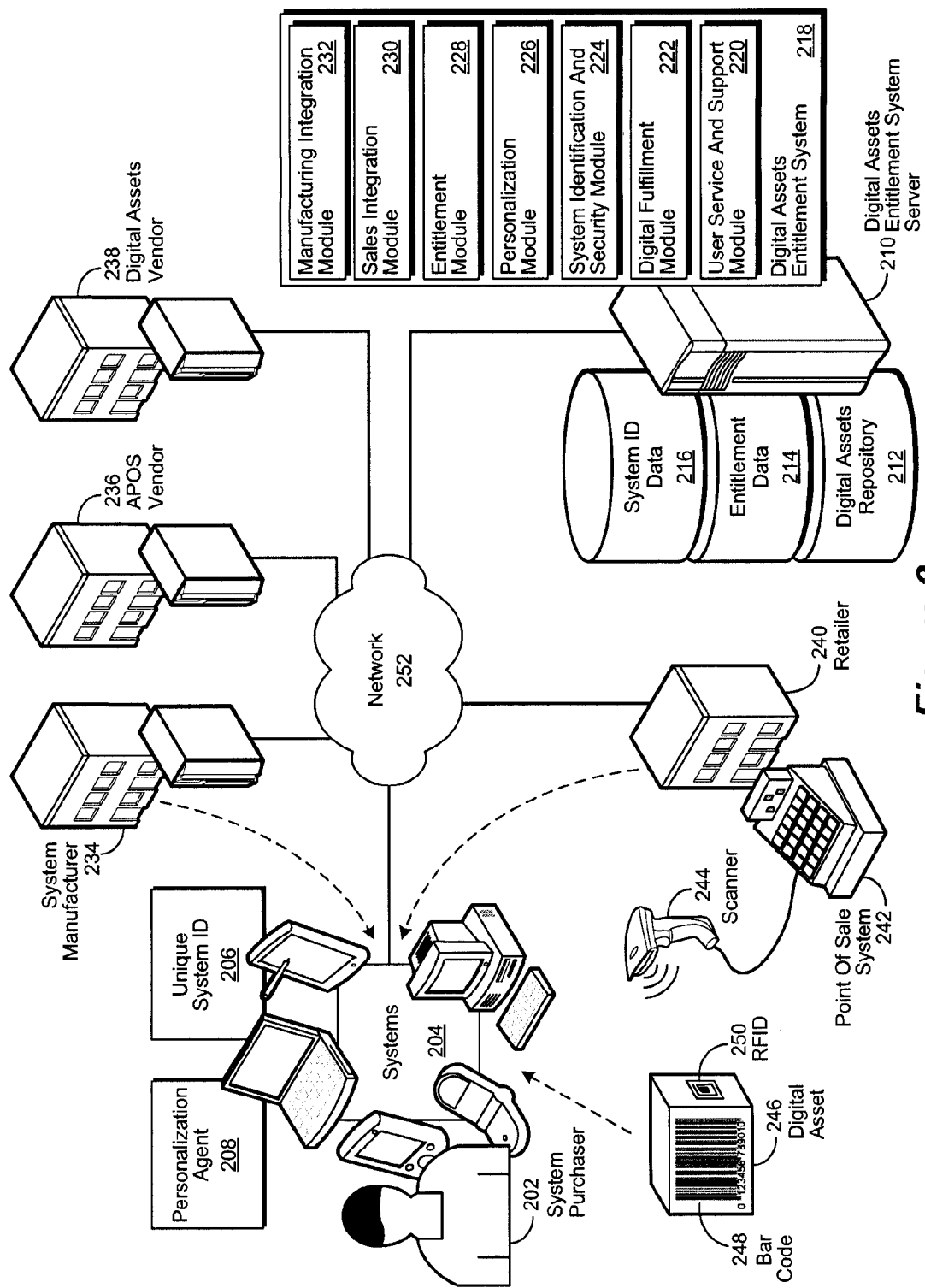
FIG. 2 is a simplified block diagram of the operation of a digital assets entitlement system.

FIG. 2 is a simplified block diagram of the operation of a digital assets entitlement system. In various embodiments, a digital assets entitlement system 218 is implemented for managing the entitlement of a system 204 to process a digital asset 246. In these and other embodiments, the digital assets entitlement system 218 may be implemented on one or more servers 210, which are connected to a network 252. In various embodiments, the network 252 may comprise a public network, such as the Internet, a physical private network, a virtual private network (VPN), or any combination thereof. As shown in FIG. 2, the digital assets entitlement system 218 comprises a user service and support module 220, a digital fulfillment module 222, and a system identification and security module 224. The digital assets entitlement system 218 likewise comprises a personalization module 226, an entitlement module 228, a sales integration module 230, and a manufacturing integration module 232. Likewise, the digital assets entitlement system 218 is able to access a digital assets data repository 212, an entitlement data repository 214, and a system identifier (ID) data repository 216, each of which may be implemented on one or more servers 210 connected to a network 252.

As used herein, a digital asset 246 refers to any digital asset such as a software application, a deliverable or performable service, music, video, software activation key, personalization instructions, files, etc. that are digitally deliverable either wholly or partially. As likewise used herein, a digital assets entitlement refers to the association of a predetermined digital asset 246 with a target system 204. In various embodiments, an entitlement record contains the digital assets entitlement data (e.g., license information, etc.) that allows the digital asset 246 to be processed by a target system 204 identified by a corresponding unique system identifier 206. In these and other embodiments, the entitlement record is processed by the entitlement module 228 and stored in the entitlement data repository 214. Likewise, as used herein, a system 204 may comprise a personal computer, a laptop computer, or a tablet computer operable to establish an on-line session with the digital assets entitlement system 218 over a connection to network 252. The system 204 may also comprise a personal digital assistant (PDA), a mobile telephone, or any other suitable device operable to store a unique system ID 206, perform digital asset entitlement operations with a personalization agent, and likewise operable to establish a connection with network 252.

In this embodiment, digital assets entitlement and system personalization operations are performed by a user, such as a system purchaser 202, in either a physical environment or an on-line environment. As an example, a physical environment may comprise a retailer 240 operating a physical point-of-sale (POS) system 242. As another example, an on-line environment may comprise a system manufacturer 234, after-point-of-sale (APOS) vendor 236, or digital assets vendor 238, that respectively accepts on-line orders for systems or digital assets over a connection to network 252.

If the digital assets entitlement and system personalization operations are performed in an on-line environment, then the system purchaser 202 decides whether to purchase a custom-configured or pre-configured system 204. If the system 204 is to be pre-configured, then it is selected for on-line purchase by the system purchaser 202 and its unique identifier 206 is determined. In one embodiment, the unique system identifier 206 is stored in the BIOS of the pre-configured system 204. However, if the system 204 is to be custom-configured, then it is custom-configured for on-line purchase by the system purchaser 202. Once manufactured by the system manufacturer 234, a unique system identifier is generated as described in greater detail herein.

In various embodiments, the manufacturing integration module 232 coordinates the custom configuration of the system 204 with the digital assets entitlement system 218. Likewise, the system identification and security module 224 coordinates the generation of the unique system identifier 204 and its storage in the repository of system identifier data 216. The system purchaser then selects a digital asset 246 for on-line purchase, followed by selecting personalization options for the pre-configured or custom-configured system. In various embodiments, the personalization module 226 coordinates the selection of personalization options with the digital assets entitlement system 218. As used herein a system personalization option refers to any feature, capability, or function that may be applied to a target system. As an example, a personal computer desktop wallpaper or user interface options (e.g., a "classic" interface) are personalization options.

However, if the digital assets entitlement and system personalization operations are performed in a physical environment, then the system purchaser 202 selects a pre-configured system 204 and physical representations of digital assets 246 to be purchased. In various embodiments, the digital asset 246 is physically represented as images and text on a card or a package, yet the digital assets themselves are not contained within the card or package. The system purchaser 202 then selects system personalization options for the pre-configured system. In various embodiments, the system personalization options are likewise physically represented as images and text on a card or a package.

The digital assets product identifier (ID) is then scanned with a scanner 244 from its corresponding physical representation, followed by scanning its corresponding digital assets activation key or other entitlement data. In various embodiments, it is not necessary to scan the digital assets activation key or other entitlement data as it is provided by the digital assets entitlement system 218 during digital asset entitlement operations described in greater detail herein. Data related to the previously selected personalization options are then likewise scanned, followed by determining the unique system identifier 206 of the pre-configured system 204. In various embodiments, the digital assets product ID, its associated activation key or entitlement data, the personalization option data, and the unique system identifier are represented by a bar code 248 or other indicia on a card or physical package. In various other embodiments, the digital assets product ID, its associated activation key or entitlement data, the personalization option data, and the unique system identifier is contained in a radio frequency identifier (RFID) 250 tag affixed to the physical representation of the digital asset. Those of skill in the art will realize that many such embodiments are possible and that the foregoing is not intended to limit the spirit, scope, or intent of the invention.

A purchase transaction for the custom-configured or pre-configured system 204 and any associated digital assets 246 and personalization options is then completed. In various embodiments, the processing of the purchase transaction is performed by the sales integration module 230. In these and other embodiments, the financial proceeds of the purchase transaction may be settled between multiple parties. For example, a system manufacturer 234 may receive a portion of the purchase transaction corresponding to the cost of the system 204. One or more digital assets vendors 238 may likewise receive a proportionate share of the purchase transaction corresponding to the digital asset 246 they respectively provide.

Digital asset entitlement operations, as described in greater detail herein, are then performed by the digital assets entitlement system 218 to bind the digital assets 246, the personalization options, and their respective digital assets entitlement data to the unique system identifier 206 of the target system 204. The resulting bound data, including data associated with the digital assets (e.g., installation files, etc.) is then stored in the repository of entitlement data 214 and the purchased system 204 is then delivered to the system purchaser 202. In various embodiments, the entitlement module 228 generates, and then processes, the digital assets entitlement data and the user service and support module 220 coordinates the delivery of the system 204 to the system purchaser 202.

Standard operating system (OS) out-of-the-box-experience (OOBE) or hypervisor boot operations are performed on the system 204, followed by loading a personalization agent 208. In various embodiments, the personalization agent 208 has a unique identifier that is associated with one or more unique system component identifiers. In one embodiment, the unique identifier of the personalization agent is uniquely associated with the current unique system identifier 206 associated with the system 204. In another embodiment, a portion of the personalization agent 208 is delivered to the system 204 in an encrypted form and is then decrypted prior to being loaded on the system 204. In this embodiment, the primary system identifier (e.g., service tag number, serial number, etc.), is used as a decryption key to decrypt the personalization agent 208.

In various other embodiments, secondary system identifiers are stored on the system 204 (e.g., in the BIOS, in Flash memory, on a hard disk, etc.) as well as in the digital assets entitlement system 218. In these and other embodiments, the digital assets entitlement system 218 uses the secondary system identifiers to encrypt a portion of the personalization agent 208 before it is downloaded to the system 204. Once downloaded, the unencrypted portion of the personalization agent 208 uses the secondary system identifiers stored on the system 204 to decrypt the encrypted portion of the personalization agent 208. In one embodiment, the secondary system identifiers are likewise encrypted and are first decrypted before they are used to decrypt the encrypted portion of the personalization agent 208. In another embodiment, the secondary system identifiers are stored in a Trusted Platform Module (TPM). Skilled practitioners of the art will recognize that many such embodiments are possible and the foregoing is not intended to limit the spirit, scope, or intent of the invention.

The personalization agent 208 queries the target system for its unique system identifier 206. In various embodiments, the unique system identifier 206 associated with the system 204 is stored in the target system's BIOS, flash memory, a hard disk, or other memory device. The personalization agent 208 then automatically establishes a connection with the digital assets entitlement system 218 and uses the unique system identifier 206 to authenticate the system 204. The unique system identifier 206 is then used by the personalization agent 208 to determine entitled digital assets and personalization options corresponding to the unique system identifier 206.

Once determined, the corresponding personalization options and digital assets 246, along with their associated digital assets entitlement data, are respectively downloaded to the target system 204 from the repository of digital assets 212 and the repository of entitlement data 214. In one embodiment, the personalization options and digital assets, along with their associated digital assets entitlement data, are downloaded from a single server 210 on the network 252. In another embodiment, the personalization options and digital assets are downloaded from one or more servers 210 on the network 252. In yet another embodiment, the personalization options, digital assets, and associated digital assets entitlement data are respectively downloaded from a plurality of servers 210 on a network 252. As an example, a first digital asset 246 may be provided by the system manufacturer 234 and a second digital asset 246 may be provided by a digital assets vendor 238. Likewise, a plurality of digital assets 246 may be provided by a corresponding plurality of digital assets vendors 238. Skilled practitioners of the art will realize that many such embodiments and examples are possible and the foregoing is not intended to limit the spirit, scope, or intent of the invention.

In various embodiments, the digital assets entitlement system 218 manages the respective location of the personalization options, digital assets, and associated digital assets entitlement data to initiate its provision. Once downloaded, the personalization agent 208 uses the digital assets entitlement data to install the digital assets 246 and personalization options on the system 204. Thereafter, the system purchaser 202 may decide to perform an after-point-of-sale (APOS) purchase of digital asset 246. As used herein, an APOS purchase of digital assets refers to any purchase of digital asset 246 made after the initial on-line or physical purchase of the system 204. In various embodiments, the APOS purchase of a digital asset 246 may be performed in a physical, on-line, or enterprise point-of-sale environment. If the APOS purchase is performed in an on-line environment, such as from APOS vendor 236, then the system purchaser 202 selects a digital asset 246 for on-line purchase. The personalization agent 208 then determines the unique system identifier 206 of the system 204. An APOS purchase transaction is then performed for purchase of the selected digital asset 246. However, if the APOS purchase is performed in a physical environment, then the purchaser selects a physical representation of a digital asset 246 to be purchased. The digital assets product identifier (ID) is then scanned from its corresponding physical representation, followed by scanning its corresponding digital assets activation key or other entitlement data.

Digital asset entitlement operations, as described in greater detail herein, are then performed by the digital assets entitlement system 218 to bind the digital asset 246 and their respective digital assets entitlement data associated with the APOS purchase to the unique system identifier 206 of the target system 204. The resulting bound data, including data associated with the digital assets (e.g., installation files, etc.) is then stored, as described in greater detail herein, in the digital assets entitlement system 218. The personalization agent 208, as likewise described in greater detail herein, then automatically establishes a connection with the digital assets entitlement system 218, downloads the purchased digital asset 246 and their associated digital assets entitlement data. Once downloaded, the personalization agent 208 then uses the associated digital assets entitlement data to install the downloaded digital asset 246 on the system 204.

FIGS. 3a-b are a simplified block diagram of a unique system identifier that remains the same when one of its associated system component identifiers has been changed in accordance with an embodiment of the invention. As shown in FIG. 3a, an original unique system identifier 320 is generated from a plurality of unique system component identifiers 302, which correspond to a plurality of system components contained in a target system. As likewise shown in FIG. 3a, the unique system component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique system component identifiers 302 likewise comprise an Original Motherboard ID 314 '19374WS238017BH', a Processor ID 316 '92348430-432919237', a Hard Drive ID 318 '183747HJ3672', etc.

As described in greater detail herein, once generated, the original unique system identifier 320 is associated, such as through a binding operation, with predetermined digital assets 332 to generate a digital assets entitlement 330. As likewise described in greater detail herein, the digital assets entitlement 330 entitles a target system, which is associated with the original unique system identifier 320, to process the digital assets 332. However, it is not uncommon for system components to be replaced due to failure, erratic performance, becoming outmoded, or for other reasons. It will be appreciated that the entitlement 330 between the original unique system identifier 320 and the digital assets 332 may be compromised as a result of such a replacement. For example, as illustrated in FIG. 3b, the Original Motherboard ID 314 '19374WS238017BH' has been replaced with a New Motherboard ID 334 '56812FR853945PL'. However, the original unique system identifier 320 remains unchanged.

In various embodiments, extract, transform, and load (ETL) and other database operations are performed to manage the integrity of the relationship between the original unique system identifier 320 and the plurality of unique system component identifiers 302. As an example, the Original Motherboard ID 314 '19374WS238017BH' may remain as a subset of the original unique system identifier 320, even though it may have been deactivated or invalidated as a unique system component identifier 302. However, in these and other embodiments, relational database operations known to those of skill in the art may be applied to maintain the relationship between the original unique system identifier 320, the New Original Motherboard ID 334 '56812FR853945PL', and the unchanged unique system component identifiers 302. Accordingly, the integrity of the entitlement 330 between the original unique system identifier 320 and the digital assets 332 is perpetuated. It will be apparent to skilled practitioners of the art that many such embodiments are possible and the foregoing is not intended to limit the spirit, scope, or intent of the invention.

Figure 4A:
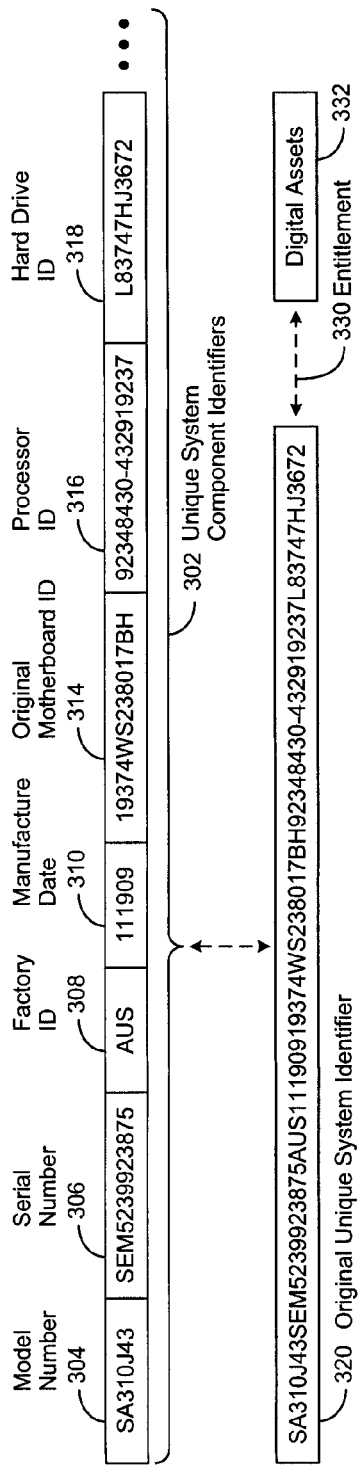
FIGS. 4a-b are a simplified block diagram of a unique system identifier that is changed when one of its associated system component identifiers has been changed.
Figure 4B:
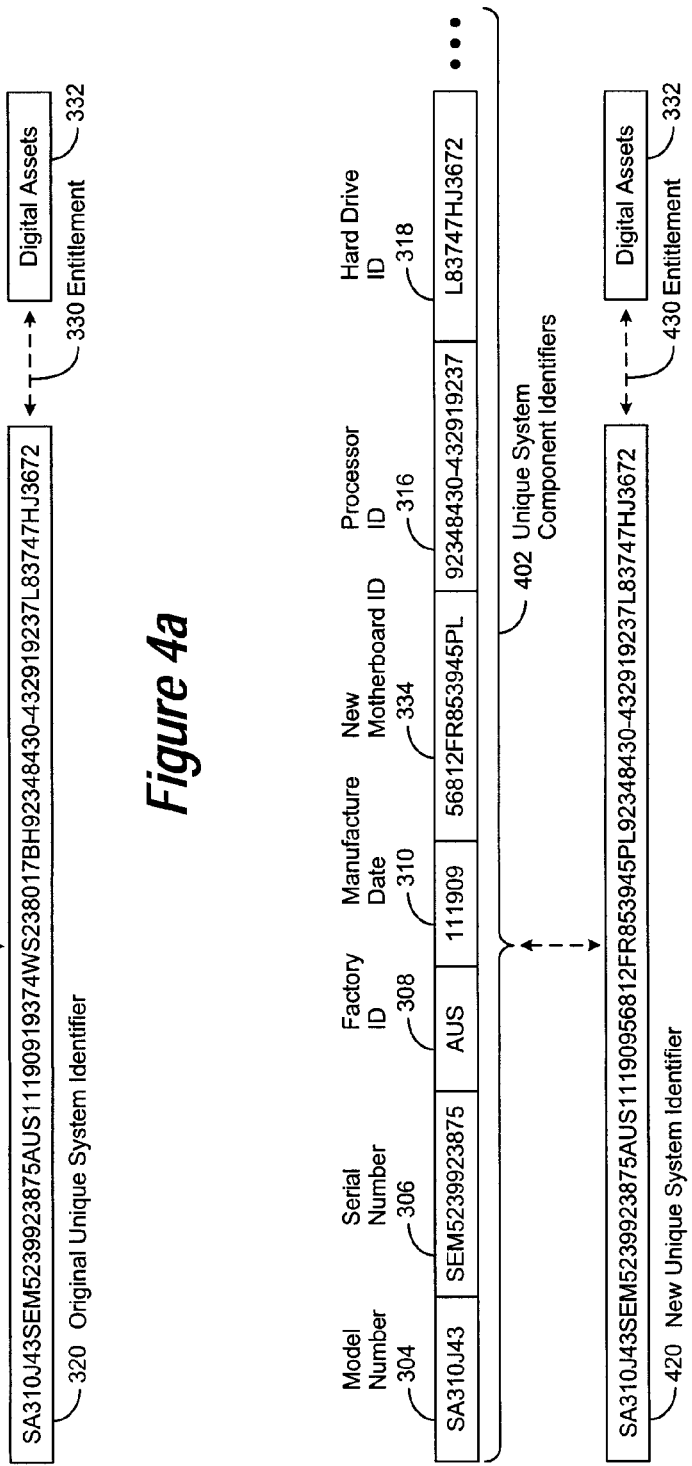

FIGS. 4a-b are a simplified block diagram of a unique system identifier that is changed when one of its associated system component identifiers has been changed in accordance with an embodiment of the invention. As shown in FIG. 4a, an original unique system identifier 320 is generated from a plurality of unique system component identifiers 302, which correspond to a plurality of system components contained in a target system. As likewise shown in FIG. 3a, the unique system component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique system component identifiers 302 likewise comprise an Original Motherboard ID 314 '19374WS238017BH', a Processor ID 316 '92348430-432919237', a Hard Drive ID 318 '183747HJ3672', etc.

As described in greater detail herein, once generated, the original unique system identifier 320 is associated, such as through a binding operation, with predetermined digital assets 332 to generate a digital assets entitlement 330. As likewise described in greater detail herein, the digital assets entitlement 330 entitles a target system, which is associated with the original unique system identifier 320, to process the digital assets 332. However, it is not uncommon for system components to be replaced due to failure, erratic performance, becoming outmoded, or for other reasons. It will be appreciated that the entitlement 330 between the original unique system identifier 320 and the digital assets 332 may be compromised as a result of such a replacement. For example, as illustrated in FIG. 4b, the Original Motherboard ID 314 '19374WS238017BH' has been replaced with a New Motherboard ID 334 '56812FR853945PL'. As a result, a new unique system identifier 420 is generated, which is a concatenation of the plurality of unique system component identifiers 402, including the New Original Motherboard ID 334 '56812FR853945PL' as a subset.

In various embodiments, a first set of operations are performed to remove the entitlement 330 between the original unique system identifier 320 and digital assets 332. A second set of operations are then performed to associate the new unique system identifier 420 with the digital assets 332 to generate a new entitlement 430. In these and other embodiments, the original unique system identifier 320 is then invalidated. Accordingly, the integrity of the original entitlement 330 between the original unique system identifier 320 and the digital assets 332 is perpetuated by the new entitlement 430 between the new unique system identifier 420 and the digital assets 332. Skilled practitioners of the art will recognize that many such embodiments are possible and the foregoing is not intended to limit the spirit, scope, or intent of the invention.

Figure 5:
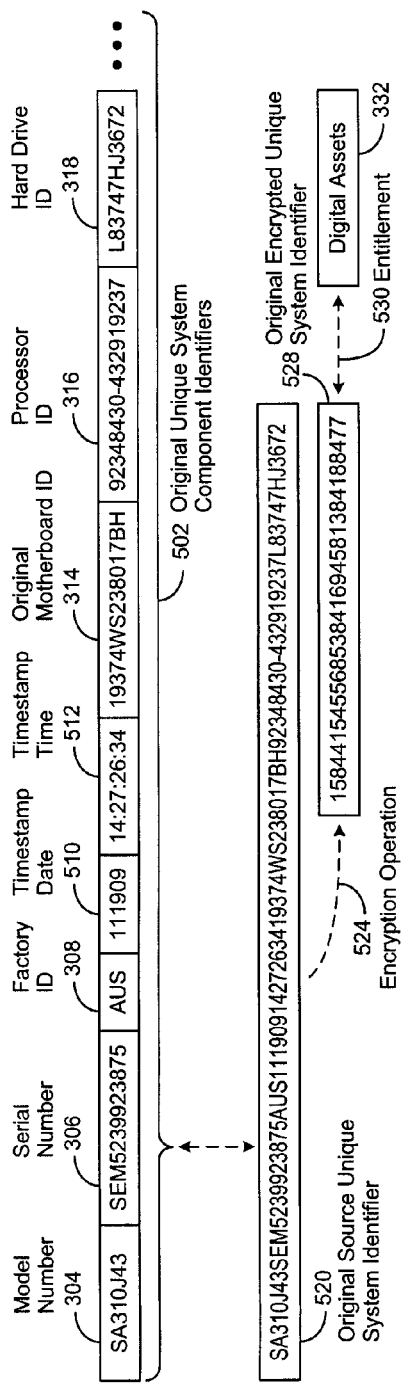
FIG. 5 is a simplified block diagram of an encrypted unique system identifier generated from a set of system component identifiers.

FIG. 5 is a simplified block diagram of an encrypted unique system identifier generated from a set of system component identifiers in accordance with an embodiment of the invention. In this embodiment, a source unique system identifier 520 is generated from a plurality of original unique system component identifiers 502, which correspond to a plurality of system components contained in a target system. As shown in FIG. 5, the original unique system component identifiers 502 comprise a Model Number 304 'SA310J43, a Serial Number 306, sometimes referred to as a service tag number or a primary system identifier, 'SEM5239923875', a Factory ID 308 'AUS', a Timestamp Date 510 '111909', and a Timestamp Time 512 '14:27:26:34'. The original unique system component identifiers 502 likewise comprise an Original Motherboard ID 314 '19374WS238017BH', a Processor ID 316 '92348430-432919237', a Hard Drive ID 318 '183747HJ3672', etc.

An encryption operation 524 is then performed on the source unique system identifier 520 to generate an original encrypted unique system identifier 528. In various embodiments, the encryption operation may comprise the use of a private key, a public key, key pairs, or any combination of keys and cryptographic operations such as implemented in a public key infrastructure (PKI). As an example, the original encrypted unique system identifier 528 may be generated using a private key associated with the manufacturer of the system and a public key associated with the system itself. In one embodiment, the Timestamp Date 510 '111909' and the Timestamp Time 512 '14:27:26:34' are likewise used to generate the encrypted unique system identifier 528. Skilled practitioners of the art will be familiar with such cryptographic operations and recognize that many such embodiments are possible and that the foregoing is not intended to limit the spirit, scope, or intent of the invention.

As described in greater detail herein, once generated, the original encrypted unique system identifier 528 is associated, such as through a binding operation, with predetermined digital assets 332 to generate a digital assets entitlement 530. As likewise described in greater detail herein, the digital assets entitlement 530 entitles a target system, which is associated with the original encrypted unique system identifier 528, to process the digital assets 332.

Figure 6:
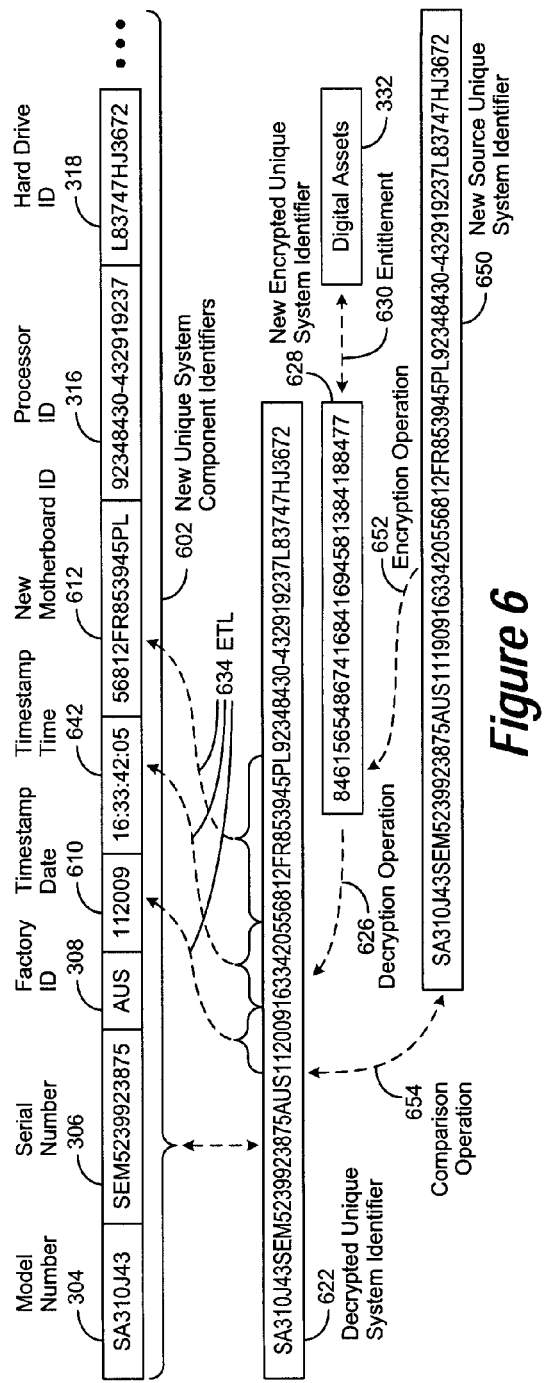
FIG. 6 is a simplified block diagram of a unique system identifier decrypted from an encrypted unique system identifier.

FIG. 6 is a simplified block diagram of a unique system identifier decrypted from an encrypted unique system identifier in accordance with an embodiment of the invention. It is not uncommon for system components to be replaced due to failure, erratic performance, becoming outmoded, or for other reasons. However, the replaced system component will typically have a different unique system component identifier. As a result, the entitlement association between a unique system identifier and predetermined digital assets may be compromised as a result of such a replacement, which in turn may prevent the target system from processing the digital assets.

In various embodiments, the unique system component identifier of the replacement system component is unknown until it is replaced in the target system. In these and other embodiments, the system component is replaced in the target system, the target system is then initiated (e.g., booted), and an inventory of unique system component identifiers is performed. In one embodiment, one or more unique system component identifiers, such as a serial number or service tag, are visible and may be visually inventoried. In another embodiment, one or more unique system component identifiers, such as a motherboard, processor, or hard drive serial number, are not visible and may be automatically inventoried.

As shown in FIG. 6, a new source unique system identifier 650 is generated from the inventoried unique system component identifiers. In one embodiment, a time stamp date and a time stamp time are components of the new source unique system identifier 650. In this embodiment, the time stamp date and a time stamp time are used to validate the authenticity of the new source unique system identifier 650. As an example, the provider of the replacement part may have stipulated that the replacement part be replaced on Nov. 12, 2009, between 8:00 AM and 6:00 PM. Accordingly, a time state date of Nov. 12, 2009 and a time stamp time of 16:33:42:05 would provide validation that the replacement part was replaced within the specified date and time interval.

An encryption operation 652 is then performed on the new source unique system identifier 650 to generate a new encrypted unique system identifier 628. As an example, the encryption operation may be performed using a private key associated with the target system and a public key associated with the provider of the replacement system component. The new encrypted unique system identifier 628 is then communicated to a digital assets entitlement system, which in turn performs a decryption operation 626 to generate a decrypted unique system identifier 622.

As likewise shown in FIG. 6, extract, transform, and load (ETL) and other database operations 634 are performed on the decrypted unique system identifier 622 to generate new unique system component identifiers 602. As shown in FIG. 6, the new unique system component identifiers now comprise a Model Number 304 'SA310J43, a Serial Number 306, 'SEM5239923875', a Factory ID 308 'AUS', a Timestamp Date 610 '112009', and a Timestamp Time 612 '16:33:42:05'. The new unique system component identifiers 602 likewise comprise a New Motherboard ID 314 '56812FR853945PL', a Processor ID 316 '92348430-432919237', a Hard Drive ID 318 '183747HJ3672', etc. In one embodiment, the Timestamp Date 610 and the Timestamp Time 612 are compared to previously authorized timestamp date and timestamp times to validate the authenticity of the new unique system component identifiers 602 and their corresponding decrypted unique system identifier 622. In this and other embodiments, if the decrypted unique system identifier 622 is validated, then a first set of operations are performed to remove the entitlement between the original encrypted unique system identifier and digital assets 332. A second set of operations are then performed to associate the new encrypted unique system identifier 628 with the digital assets 332 to generate a new entitlement 630. Accordingly, the integrity of the original entitlement between the original encrypted unique system identifier and the digital assets 332 is perpetuated by the new entitlement 630 between the new encrypted unique system identifier 628 and the digital assets 332.

In various other embodiments, the provider of the replacement system component is able to determine its associated unique system component identifier. In one embodiment, the unique system component identifier is known in advance. In another embodiment, the unique system component identifier may be one of a pool of, or a range of, possible unique system component identifiers set aside for replacement purposes. As described in greater detail herein, a new source unique identifier is generated, using the unique system component identifier of the component to be replaced. Once the new source unique identifier is generated the unique system component identifier of the replaced system component is invalidated. In these and other embodiments, the system component is replaced in the target system, the target system is then initiated (e.g., booted), and an inventory of unique system component identifiers is performed. In one embodiment, one or more unique system component identifiers, such as a serial number or service tag, are visible and may be visually inventoried. In another embodiment, one or more unique system component identifiers, such as a motherboard, processor, or hard drive serial number, are not visible and may be automatically inventoried.

As shown in FIG. 6, a new source unique system identifier 650 is generated from the inventoried unique system component identifiers. In one embodiment, a time stamp date and a time stamp time are components of the new source unique system identifier 650. In this embodiment, the time stamp date and a time stamp time are used to validate the authenticity of the new source unique system identifier 650. An encryption operation 652 is then performed on the new source unique system identifier 650 to generate a new encrypted unique system identifier 628. As an example, the encryption operation may be performed using a private key associated with the target system and a public key associated with the provider of the replacement system component. The new encrypted unique system identifier 628 is then communicated to a digital assets entitlement system, which in turn performs a decryption operation 626 to generate a decrypted unique system identifier 622.

Comparison operations 654 are then performed between the new source unique system identifier and the decrypted unique system identifier 622. If the comparison operations 654 are successful, then a first set of operations are performed to remove the entitlement between the original encrypted unique system identifier and digital assets 332. A second set of operations are then performed to associate the new encrypted unique system identifier 628 with the digital assets 332 to generate a new entitlement 630. Accordingly, the integrity of the original entitlement between the original encrypted unique system identifier and the digital assets 332 is perpetuated by the new entitlement 630 between the new encrypted unique system identifier 628 and the digital assets 332. Skilled practitioners of the art will recognize that many such embodiments are possible and the foregoing is not intended to limit the spirit, scope, or intent of the invention.

Figure 7A:
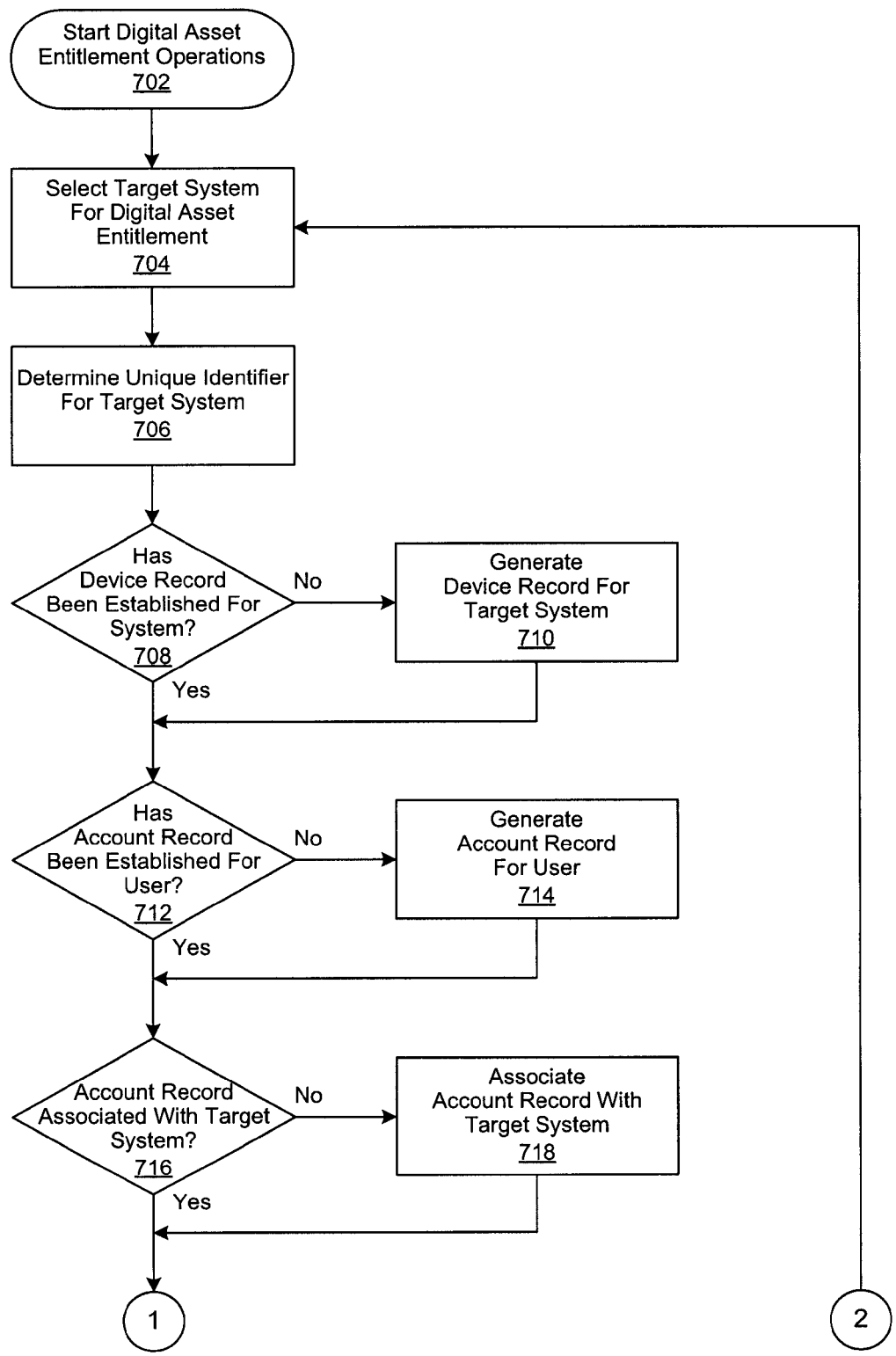
FIGS. 7a-b are a generalized flow chart of the performance of digital asset entitlement operations.
Figure 7B:
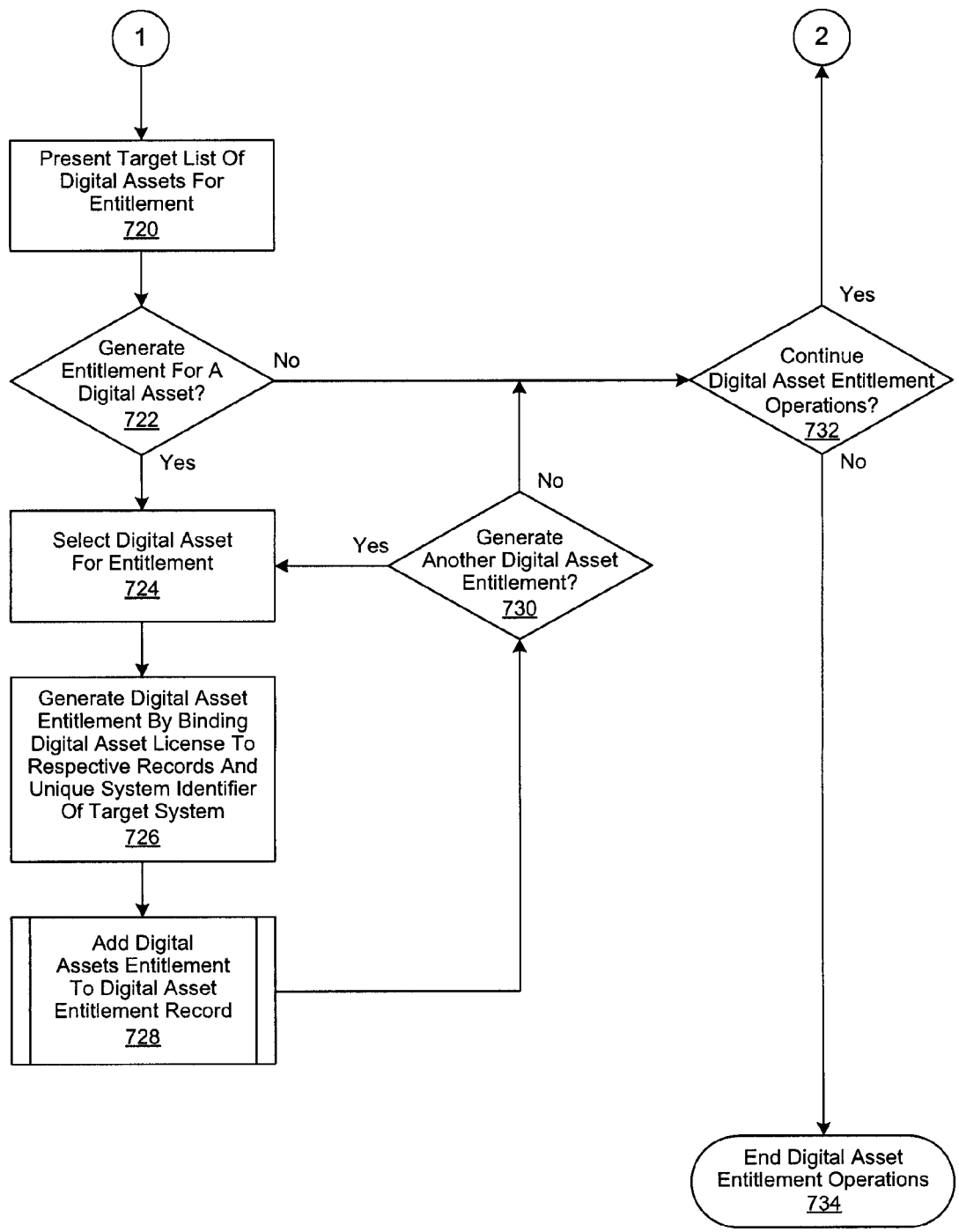

FIGS. 7a-b are a generalized flow chart of the performance of digital asset entitlement operations in an embodiment of the invention. In this embodiment, digital asset entitlement operations are started in step 702, followed by the selection of a target system in step 704 for digital assets entitlement. The unique system identifier of the target system, as described in greater detail herein, is determined in step 706, followed by a determination being made in step 708 whether a device record has been established for the target system. If not, then the device record is generated in step 710. As used herein, a device record refers to a data record containing data related to a system which will receive an entitlement to process associated digital assets. In various embodiments, the unique system identifier of the target system is stored in the device record. In various embodiments, other records may be associated with the device record to further describe the system, such as its model, type, make, internal identifiers, etc.

Once the device record has been generated, or if it is determined in step 708 that it has already been established, then a determination is made in step 712 whether an account record has been established for a user. If not, then the account record is generated for the user in step 714. As used herein, an account record refers to a data record containing data related to the association of multiple devices or systems to one or more entities. In various embodiments, the entity may be a single individual or a group of individuals. As an example, the entity may be a household with multiple PCs, a small business with several employees, a large corporation with many employees, etc. Other records may be attached to the account to further describe the account holder, payment information related to the account, etc. Accounts may further be broken down or organized into sub-accounts as needed, such as to describe departments within an enterprise). In various embodiments, a user may be associated with a single device or system or multiple devices or systems in the account record. Conversely, a group of users may be associated with a single device or system or multiple devices in the account record. Further more groups of individual users may likewise be associated with groups of individual devices or systems. Those of skill in the art will recognize that many such associations are possible and the foregoing is not intended to limit the spirit, scope, or intent of the invention. Once the account record has been generated, or if it is determined in step 712 that it has already been established, then a determination is made in step 716 whether the account record is associated with the target system. If not, then the account record is associated with the target system in step 718.

Once the account record has been associated with the target system, or if it is determined in step 716 that it has already been associated, then a target list of digital assets is presented in step 720 for entitlement. A determination is then made in step 722 whether to generate an entitlement for a digital asset. If not, then a determination is made in step 732 whether to continue digital asset entitlement operations. If so, then the process is continued, proceeding with step 704. Otherwise digital asset entitlement operations are ended in step 734. However, if it is determined in step 722 to generate an entitlement for a digital asset, then a target digital asset is selected in step 724. A digital assets entitlement is then generated in step 726 by performing operations to associate the selected digital asset's corresponding license record with the aforementioned device record, account record, and other predetermined records. The resulting digital assets entitlement association is then added to the entitlement record in step 728. A determination is then made in step 730 whether to generate another digital assets entitlement. If so, the process is continued, proceeding with step 724. Otherwise, a determination is made in step 732 whether to continue digital asset entitlement operations. If so, then the process is continued, proceeding with step 704. Otherwise digital asset entitlement operations are ended in step 734.

Figure 8A:
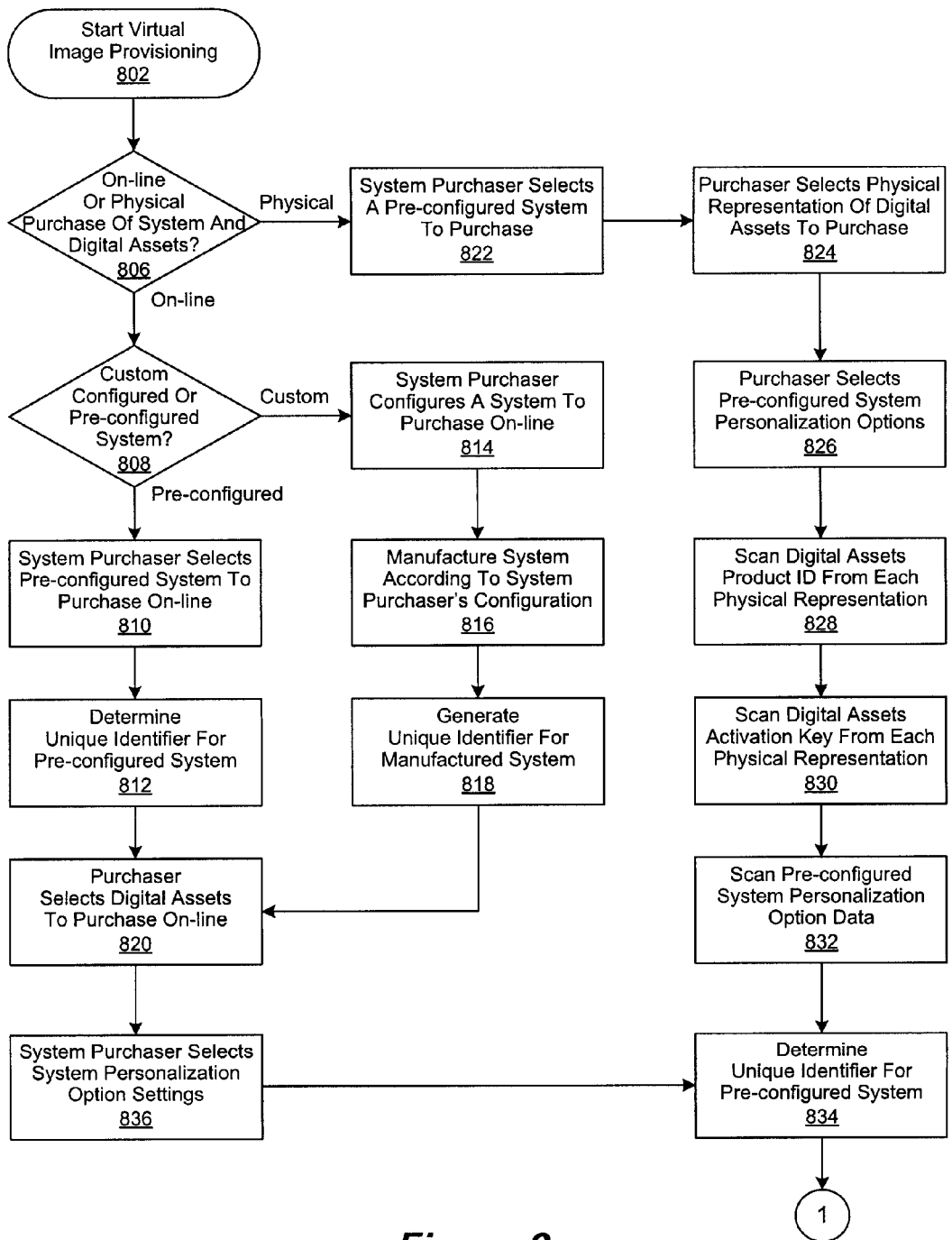
FIGS. 8a-c are a generalized flow chart of the performance of virtual software image provisioning migration operations.
Figure 8B:
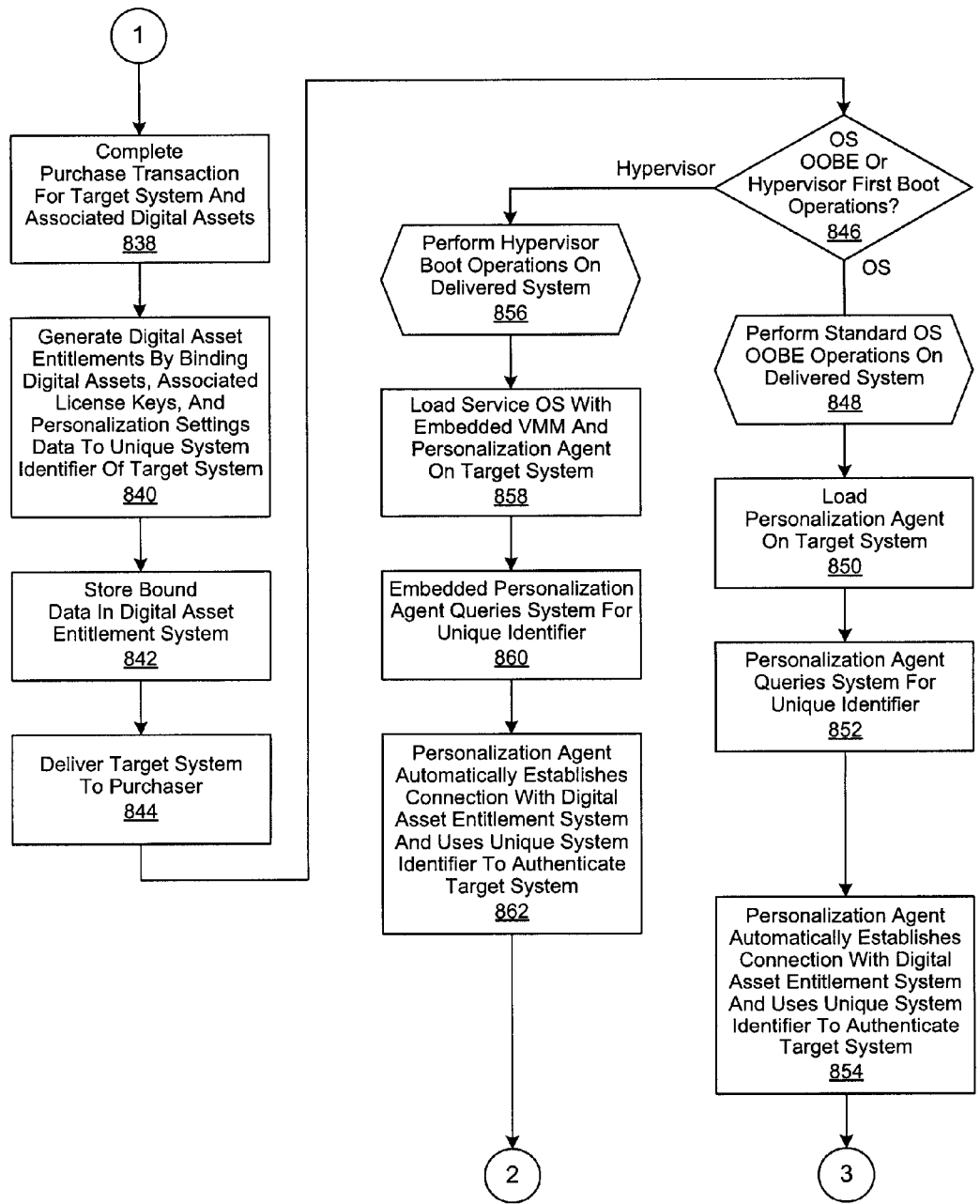
Figure 8C:
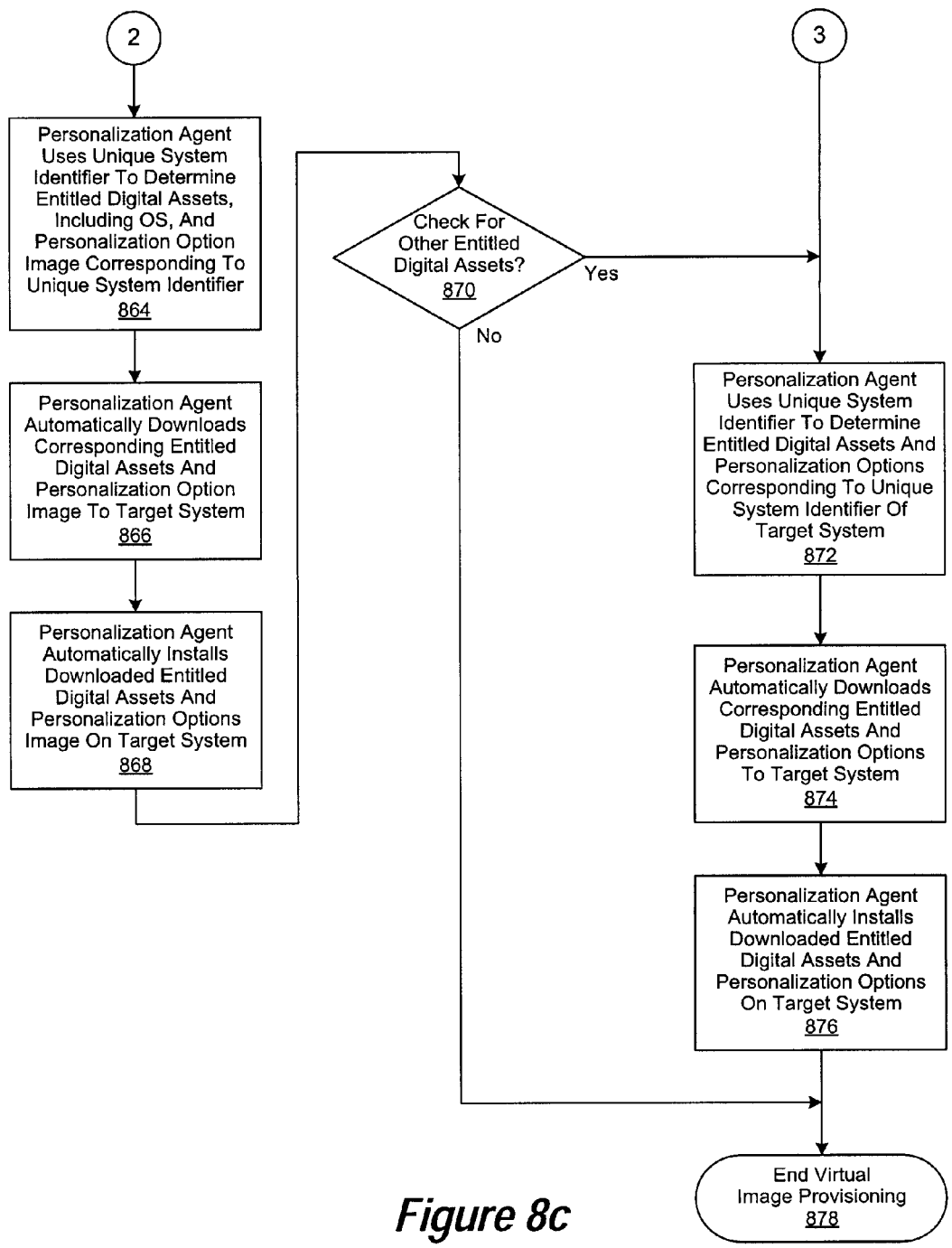

FIGS. 8a-c are a generalized flow chart of the performance of virtual software image provisioning operations in accordance with an embodiment of the invention. As used herein, a virtual software image refers to a software image familiar to those of skill in the art that is executable in a virtual machine environment. In this embodiment, virtual software image provisioning and digital assets migration operations are begun in step 802. A determination is then made in step 806 whether a new system and digital assets are to be purchased in an on-line or physical environment. If it is determined in step 806 to purchase a new system and digital assets in an on-line environment, then a determination is made in step 808 whether the new system is to be a custom-configured system or a pre-configured system. If it is determined in step 808 that the new system is to be pre-configured, then the system purchaser selects the target system for on-line purchase in step 810. The unique identifier for the selected pre-configured system is then determined in step 812. In one embodiment, the unique system identifier is stored in the BIOS or a memory device of the pre-configured system.

However, if it is determined in step 808 that the new system is to be a custom-configured system, then the system purchaser configures the system for on-line purchase in step 814. The system is then manufactured in step 816 according to the custom configuration selections made by the purchaser in step 814. Once manufactured, a unique system identifier is generated in step 818, as described in greater detail herein. Then, or after the unique system identifier is determined for the pre-configured system in step 812, the system purchaser selects digital assets for on-line purchase in step 820, followed by selecting personalization option settings for the custom-configured system in step 836.

However, if it is determined in step 806 that a new system and digital assets are to be purchased in a physical environment, then a pre-configured system is selected by the system purchaser in step 822. The system purchaser then selects a physical representation of digital assets to be purchased in step 824. In various embodiments, the digital assets are physically represented as images and text on a card or a package, yet the digital assets themselves are not contained within the card or package. The system purchaser then selects system personalization options for the pre-configured system in step 826. In various embodiments, the system personalization options are physically represented as images and text on a card or a package.

The digital assets product identifier (ID) is then scanned from its corresponding physical representation in step 828, followed by scanning its corresponding digital assets activation key or other entitlement data in step 830. Data related to the previously selected personalization options are then likewise scanned in step 832, followed by determining the unique system identifier of the pre-configured system in step 834. In various embodiments, the digital assets product ID, its associated activation key or entitlement data, the personalization option data, and the unique system identifier are represented by a bar code or other indicia on a card or physical package. In various other embodiments, the digital assets product ID, its associated activation key or entitlement data, the personalization option data, and the unique system identifier is contained in a radio frequency identifier (RFID) tag affixed to the physical representation of the digital asset. Those of skill in the art will realize that many such embodiments are possible and that the foregoing is not intended to limit the spirit, scope, or intent of the invention.

Once the unique system identifier has been determined in step 834, or the system personalization option settings for the custom-configured system have been provided in step 836, a purchase transaction for the custom-configured or pre-configured target system and any associated digital assets and personalization options is completed in step 838. Digital asset entitlement operations, as described in greater detail herein, are then performed by a digital assets entitlement system in step 840 to bind the digital assets, the personalization options, and their respective digital assets entitlement data to the unique system identifier of the target system. The resulting bound data, including data associated with the digital assets (e.g., installation files, etc.) is then stored in the digital assets entitlement system in step 842 and the custom-configured or pre-configured system is then delivered to the system purchaser in step 844.

A determination is then made in step 846 whether to perform standard operating system (OS) out-of-the-box-experience (OOBE) or hypervisor first boot operations on the target system. If it is determined in step 846 to perform standard OS OOBE operations, then they are performed on the target system in step 848, followed by loading a personalization agent on the target system in step 850. In various embodiments, the personalization agent has a unique identifier that is associated with one or more unique system component identifiers. In one embodiment, the unique identifier of the personalization agent is uniquely associated with the current unique system identifier associated with the target system. In another embodiment, a portion of the personalization agent is delivered to the target system in an encrypted form and is then decrypted prior to being loaded on the target system. In this embodiment, the primary system identifier (e.g., service tag number, serial number, etc.), is used as a decryption key to decrypt the personalization agent.

In various other embodiments, secondary system identifiers are stored on the target system (e.g., in the BIOS, in Flash memory, on a hard disk, etc.) as well as in the digital assets entitlement system. In these and other embodiments, the digital assets entitlement system uses the secondary system identifiers to encrypt a portion of the personalization agent before it is downloaded to the target system. Once downloaded, the unencrypted portion of the personalization agent uses the secondary system identifiers stored on the target system to decrypt the encrypted portion of the personalization agent. In one embodiment, the secondary system identifiers are likewise encrypted and are first decrypted before they are used to decrypt the encrypted portion of the personalization agent. In another embodiment, the secondary system identifiers are stored in a Trusted Platform Module (TPM). Skilled practitioners of the art will recognize that many such embodiments are possible and the foregoing is not intended to limit the spirit, scope, or intent of the invention.

The personalization agent then queries the target system for its unique system identifier in step 852. In various embodiments, the unique system identifier associated with the target system is stored in the target system's BIOS, flash memory, a hard disk, or other memory device. The personalization agent then automatically establishes a connection with the digital assets entitlement system in step 854.

However, if it is determined in step 846 to perform hypervisor (e.g., virtual machine monitor, or VMM) first boot operations on the target system, then they are performed in step 856. In step 858 embodiments, a service OS comprising an embedded virtual machine monitor (VMM) and an embedded personalization agent are loaded on the target system. The embedded personalization agent queries the target system for its unique system identifier in step 860, followed by automatically establishing a connection with the digital assets entitlement system in step 862 and using the unique system identifier to authenticate the system.

Then, in step 864, the unique system identifier is used by the personalization agent to determine an entitled digital assets and personalization options virtual software image corresponding to the unique system identifier. In various embodiments, the virtual software image comprises an operating system, such a Windows® variant produced by Microsoft® Inc., or a Linux OS variant. In these and other embodiments, various such virtual software images may contain additional digital assets, such as software application and digital content, which may be associated with a predetermined user of the system. As an example, a user in an accounting department may be associated with a virtual software image comprising a Windows® OS variant and a financial software application. As another example, a user in an engineering department may be associated with a virtual software image comprising a Linux OS variant and a computer-aided-design (CAD) software application. Skilled practitioners of the art will realize that many such embodiments are possible and that the foregoing are not intended to limit the spirit, scope or intent of the invention.

Once determined, the corresponding virtual software image comprising personalization option settings and digital assets, along with their associated digital assets entitlement data, is downloaded in step 866 to the target system. Once downloaded, the personalization agent provisions the target system by using the digital assets entitlement data in step 868 to install the virtual software image. A determination is then made in step 870 whether to check for additional entitled digital assets and personalization options. As an example, the target system may be entitled to process an individual digital asset that is not included in the virtual software image.

If it is determined in step 870 to check for additional entitled digital assets, or after the system is authenticated step 854, the unique system identifier is used by the personalization agent in step 872 to determine entitled digital assets and personalization options corresponding to the target system. Once determined, the corresponding personalization options and digital assets, along with their associated digital assets entitlement data, are downloaded in step 874 to the target system. The personalization agent then uses the digital assets entitlement data in step 876 to install the digital assets and personalization options on the target system. Then, or if it was determined in step 870 to not check for other entitled digital assets and personalization options, virtual software image provisioning and digital assets migration operations are ended in step 878.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. An information handling system for managing the entitlement of digital assets, comprising:
    a storage medium comprising a repository of system identifier data, digital assets data, and digital assets entitlement data; and
    a processor, the processor being operable to:
        perform installation operations to install a service operating system comprising a virtual machine monitor and a personalization agent on a target system;
        receive a set of system identifier data associated with the target system, wherein the set of system identifier data is provided by the personalization agent;
        process the set of system identifier data to determine a corresponding set of digital assets entitlement data; and
        provide the set of digital assets entitlement data and an associated set of digital assets data to the personalization agent for installation on the target system; and wherein
        the personalization agent comprises an encrypted portion and an unencrypted portion; and,
        upon download, the unencrypted portion use secondary system identifiers to decrypt the encrypted portion of the personalization agent.

2. The information handling system of claim 1, wherein the installation of the set of digital assets entitlement data on the target system allows the target system to process data associated with the installed set of digital assets data.

3. The information handling system of claim 1, wherein the set of digital assets data comprises a virtual software image further comprising an operating system operable to be executed in a virtual machine on the target system, wherein the virtual machine is generated and managed by the virtual machine monitor.

4. A computer-implemented method for managing the entitlement of digital assets, comprising:
    performing installation operations to install a service operating system comprising a virtual machine monitor and a personalization agent on a target system;
    receiving a set of system identifier data associated with the target system, wherein the set of system identifier data is provided by the personalization agent;
    processing the set of system identifier data to determine a corresponding set of digital assets entitlement data; and
    providing the set of digital assets entitlement data and an associated set of digital assets data to the personalization agent for installation on the target system; and wherein
        the personalization agent comprises an encrypted portion and an unencrypted portion; and,
        upon download, the unencrypted portion use secondary system identifiers to decrypt the encrypted portion of the personalization agent.

5. The method of claim 4, wherein the installation of the set of digital assets entitlement data on the target system allows the target system to process data associated with the installed set of digital assets data.

6. The method of claim 4, wherein the set of digital assets data comprises a virtual software image further comprising an operating system operable to be executed in a virtual machine on the target system, wherein the virtual machine is generated and managed by the virtual machine monitor.

7. A non-transitory computer-usable medium embodying computer program code, the computer program code comprising processor executable instructions that when executed cause the processor to perform the steps of:
    performing installation operations to install a service operating system comprising a virtual machine monitor and a personalization agent on a target system;
    receiving a set of system identifier data associated with the target system, wherein the set of system identifier data is provided by the personalization agent;
    processing the set of system identifier data to determine a corresponding set of digital assets entitlement data; and
        providing the set of digital assets entitlement data and an associated set of digital assets data to the personalization agent for installation on the target system; and wherein
    the personalization agent comprises an encrypted portion and an unencrypted portion; and,
    upon download, the unencrypted portion use secondary system identifiers to decrypt the encrypted portion of the personalization agent.

8. The non-transitory computer usable medium of claim 7, wherein the installation of the set of digital assets entitlement data on the target system allows the target system to process data associated with the installed set of digital assets data.

9. The non-transitory computer usable medium of claim 7, wherein the set of digital assets data comprises a virtual software image further comprising an operating system operable to be executed in a virtual machine on the target system, wherein the virtual machine is generated and managed by the virtual machine monitor.

* * * * *